(12) United States Patent
Baba et al.

(10) Patent No.: US 10,706,853 B2
(45) Date of Patent: Jul. 7, 2020

(54) SPEECH DIALOGUE DEVICE AND SPEECH DIALOGUE METHOD

(71) Applicant: Mitsubishi Electric Corporation, Tokyo (JP)

(72) Inventors: Naoya Baba, Tokyo (JP); Yuki Furumoto, Tokyo (JP); Masanobu Osawa, Tokyo (JP); Takumi Takei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 271 days.

(21) Appl. No.: 15/763,322

(22) PCT Filed: Nov. 25, 2015

(86) PCT No.: PCT/JP2015/083049
§ 371 (c)(1),
(2) Date: Mar. 26, 2018

(87) PCT Pub. No.: WO2017/090115
PCT Pub. Date: Jun. 1, 2017

(65) Prior Publication Data
US 2018/0277119 A1    Sep. 27, 2018

(51) Int. Cl.
*G10L 15/00* (2013.01)
*G10L 15/26* (2006.01)
(Continued)

(52) U.S. Cl.
CPC .............. *G10L 15/32* (2013.01); *G10L 15/22* (2013.01); *G10L 15/30* (2013.01); *G10L 17/005* (2013.01);
(Continued)

(58) Field of Classification Search
CPC ......... G10L 13/00; G10L 13/08; G10L 15/22; G10L 2015/223; G10L 15/26; G10L 15/30; G10L 15/08; G10L 15/18; G06F 3/167
See application file for complete search history.

(56) References Cited

U.S. PATENT DOCUMENTS 8,600,746 B1 * 12/2013 Lei .......................... G10L 15/22
704/235
2007/0094033 A1 * 4/2007 Nagashima ............. G10L 15/22
704/272
(Continued)

FOREIGN PATENT DOCUMENTS

JP    62-131298 A    6/1987
JP    2004-258233 A   9/2004
(Continued)

OTHER PUBLICATIONS

International Search Report (PCT/ISA/210) issued in PCT/JP2015/083049, dated Jan. 26, 2016.

*Primary Examiner* — Olujimi A Adesanya
(74) *Attorney, Agent, or Firm* — Birch, Stewart, Kolasch & Birch, LLP

(57) ABSTRACT

A correspondence relationship between keywords for instructing the start of a speech dialogue and modes of a response is defined in a response-mode correspondence table. A response-mode selecting unit selects a mode of a response corresponding to a keyword included in the recognition result of a speech recognition unit using the response-mode correspondence table. A dialogue controlling unit starts the speech dialogue when the keyword is included in the recognition result of the speech recognition unit, determines a response in accordance with the subsequent recognition result from the speech recognition unit, and controls a mode of the response in such a manner as to match (Continued)

the mode selected by the response-mode selecting unit. A speech output controlling unit generates speech data on the basis of the response and mode controlled by the dialogue controlling unit and outputs the speech data to a speaker.

8 Claims, 12 Drawing Sheets

(51) Int. Cl.
    *G10L 13/00*     (2006.01)
    *G10L 13/08*     (2013.01)
    *G10L 21/00*     (2013.01)
    *G10L 25/00*     (2013.01)
    *G10L 15/32*     (2013.01)
    *G10L 15/22*     (2006.01)
    *G10L 15/30*     (2013.01)
    *G10L 17/00*     (2013.01)
    *G10L 17/22*     (2013.01)

(52) U.S. Cl.
    CPC ........ *G10L 17/22* (2013.01); *G10L 2015/223* (2013.01)

(56) References Cited

U.S. PATENT DOCUMENTS

| | | | |
|---|---|---|---|
| 2009/0043583 A1* | 2/2009 | Agapi | G10L 13/033 704/260 |
| 2011/0218696 A1 | 9/2011 | Okada et al. | |
| 2013/0185072 A1* | 7/2013 | Huang | G10L 15/30 704/246 |
| 2014/0074473 A1 | 3/2014 | Takei et al. | |
| 2015/0269953 A1* | 9/2015 | Siami | G10L 21/0364 704/201 |
| 2016/0104486 A1* | 4/2016 | Penilla | G10L 17/06 704/232 |

FOREIGN PATENT DOCUMENTS

| | | |
|---|---|---|
| JP | 2004-301875 A | 10/2004 |
| JP | 4223832 B2 | 2/2009 |
| WO | WO 2008/149482 A1 | 12/2008 |
| WO | WO 2013/038440 A1 | 3/2013 |

* cited by examiner

FIG. 3

| Keyword | Response Mode ID |
|---|---|
| Start Easy Speech Operation | A |
| Start Speech Operation | B |
| Start Detailed Speech Operation | C |
| Start Speech Operation | D |
| ⋮ | ⋮ |

FIG. 4

| Response Mode ID | Speech | | | Language | Recognition | Level Of Proficiency (Amount Of Information) | Output Means |
|---|---|---|---|---|---|---|---|
| | Speed | Gender | Age Group | | | | |
| A | Slow | Woman | Young Age Group | Japanese | Local | For Beginners (Large) | Speech / Display |
| B | Normal | Woman | Middle Age Group | Japanese | Local | For Intermediates (Normal) | Speech / Display |
| C | Fast | Man | Middle Age Group | Japanese | Server | For Advanced (Small) | Speech / Display |
| D | Normal | Woman | Middle Age Group | English | Local | For Intermediates (Normal) | Speech / Display |
| ... | ... | ... | ... | ... | ... | ... | ... |

SPEECH DIALOGUE DEVICE AND SPEECH DIALOGUE METHOD

TECHNICAL FIELD

The present invention relates to a speech dialogue device and a speech dialogue method for operating a target device in accordance with the result of recognition of the utterance by a user.

BACKGROUND ART

A conventional speech dialogue device mounted in a car navigation device or the like receives an instruction to start speech recognition from a user. This is to prevent erroneous recognition due to noise and the like other than the utterance by the user. For this reason, a steering wheel or the like is provided with a button for instructing the start of the speech recognition (hereinafter referred to as "instruction button for starting speech recognition"), for example. After the user presses the instruction button for starting speech recognition, the user utters a command or the like for operating a target device to operate (hereinafter referred to as "device operation command or the like"). The speech dialogue device starts recognition when detecting the pressing of the instruction button for starting speech recognition, and recognizes the device operation command or the like from the speech uttered.

In addition, since users who use the speech dialogue device vary from beginners to the advanced in terms of familiarity with the speech dialogue, the speech dialogue device needs to respond to users with different levels of proficiency. Accordingly, Patent Literature 1 describes a technique for changing a system response in accordance with the user's level of proficiency in the speech dialogue. The system response includes guidance on content to which a user responds.

CITATION LIST

Patent Literatures

Patent Literature 1: JP 2004-258233 A

SUMMARY OF INVENTION

Technical Problem

When the instruction button for starting speech recognition is pressed, the conventional speech dialogue device starts speech recognition of the device operation command or the like, and changes the response mode while proceeding with the dialogue, such as changing the mode of the system response when the number of outputs of the guidance exceeds a predetermined threshold value. As a result, it takes time to change the response mode. Particularly, as is the case with in-vehicle equipment such as a car navigation device, when a device is shared and used by a plurality of users having different levels of proficiency in the speech dialogue, it is not possible to change the response mode instantaneously in response to change of a speaker.

To quickly change the response mode, conceivably, the speech dialogue device may be configured such that the screen displays buttons in which response modes are defined in advance (hereinafter referred to as "preset buttons") and a speech dialogue is started in the response mode corresponding to the preset button pressed by the user. However, as is the case with in-vehicle equipment or the like such as a car navigation device, when a device is shared and used by a plurality of users having different levels of proficiency in the speech dialogue, a user needs to select and press a preset button, in which a desired response mode is defined, from among the plurality of preset buttons for each change of a speaker, which is troublesome. In addition, displaying the plurality of preset buttons is difficult in a device having display restrictions such as in-vehicle equipment.

Since the conventional speech dialogue device has the configuration described above, there is a problem in that it is not possible to instantaneously and easily change a mode of a response in a speech dialogue.

The present invention has been made to solve the above-described problem, and it is an object of the invention to instantaneously and easily change a mode of a response in a speech dialogue.

Solution to Problem

A speech dialogue device according to the present invention includes a speech recognizer to recognize uttered speech, a response-mode selector to select a mode of a response corresponding to a keyword included in a recognition result of the speech recognizer using a response-mode correspondence table defining a correspondence relationship between the keyword for instructing start of a speech dialogue and the mode of the response, a dialogue controller to start the speech dialogue when the keyword is included in the recognition result of the speech recognizer determine a response in accordance with a subsequent recognition result from the speech recognizer, and control a mode of the response in such a manner as to match the mode selected by the response-mode selector, and a speech output controller to generate speech data from the response controlled by the dialogue controller and output the speech data to a speaker, and the speech recognizer includes a local recognizer to recognize the uttered speech using a local speech recognition dictionary in the speech dialogue device and a server recognizer to use and cause an external speech recognition server to recognize the uttered speech and obtain a recognition result, and the response-mode selector selects the local recognizer or the server recognizer that corresponds to the keyword using the response-mode correspondence table defining a correspondence relationship between the keyword and the local recognizer or the server recognizer, and the dialogue controller switches to the local recognizer or the server recognizer selected by the response-mode selector and determines the response in accordance with a recognition result from the local recognizer or the server recognizer after the switching.

Advantageous Effects of Invention

According to the present invention, control is made to become a mode of a response corresponding to a keyword for instructing the start of a speech dialogue. Therefore, when the user utters the keyword for instructing the start of the speech dialogue, the speech dialogue device switches the mode of the response while starting the speech dialogue. Thus, the mode of the response can be changed instantaneously and easily in the speech dialogue. In addition, since not only the recognition result of the local recognizer but also the recognition result of the server recognizer can be used, it is possible to use high-performance speech recognition by the server recognizer.

BRIEF DESCRIPTION OF DRAWINGS

FIG. 3 is a diagram illustrating an example of a response-mode correspondence table in the speech dialogue device according to the first embodiment.

FIG. 4 is a diagram illustrating an example of a response-mode database in the speech dialogue device according to the first embodiment.

DESCRIPTION OF EMBODIMENTS

Embodiments of the present invention will be described below with reference to accompanying drawings to describe the present invention in further detail.

First Embodiment

Figure 1:
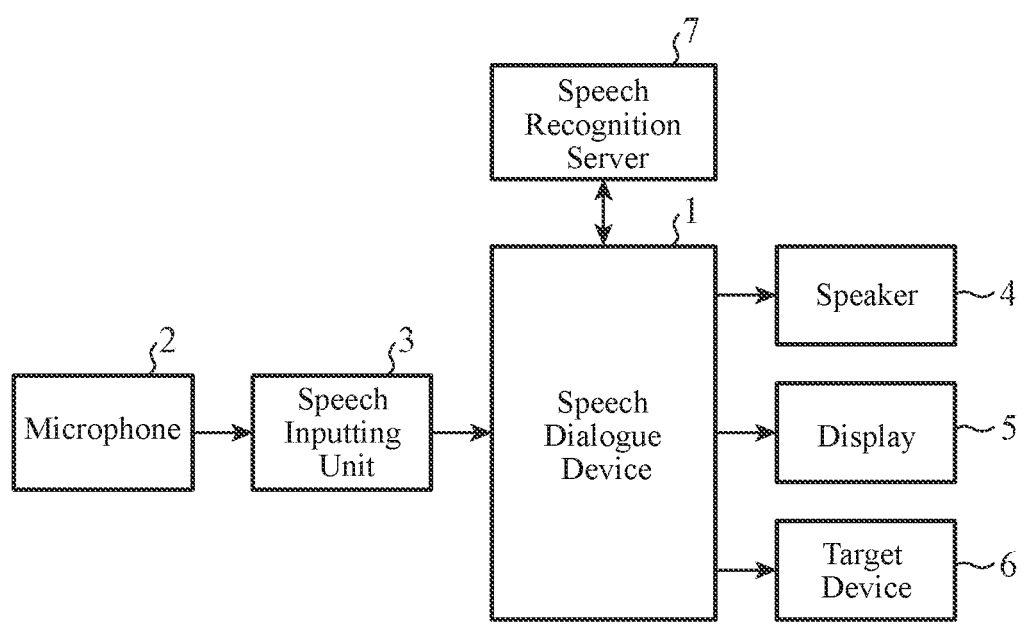
FIG. 1 is a block diagram illustrating an overall configuration of a speech dialogue system to which a speech dialogue device according to a first embodiment of the present invention is used.

FIG. 1 is a block diagram illustrating an overall configuration of a speech dialogue system to which a speech dialogue device 1 according to the first embodiment of the present invention is used. In this speech dialogue system, the speech dialogue device 1 performs a speech dialogue with a user, and a target device 6 is operated in accordance with the result of the recognition of the speech uttered by the user. A microphone 2, a speech inputting unit 3, a speaker 4, a display 5, and the target device 6 are connected to this speech dialogue device 1. The first embodiment will be described below using an example where the speech dialogue system is mounted in a vehicle.

The example in FIG. 1 illustrates a configuration in which the speech dialogue device 1 and the target device 6 are independent of each other, but the configuration may be such that the speech dialogue device 1 is incorporated into the target device 6. For example, the speech dialogue device 1 is a mobile information terminal such as a personal computer (PC), a tablet PC, or a smartphone. Alternatively, the speech dialogue device 1 may be incorporated into a car navigation device, a car audio device or the like serving as the target device 6. Alternatively, the functions included in the speech dialogue device 1 may be distributed among a server on a network, a mobile information terminal such as a smartphone, and in-vehicle equipment such as a car navigation device.

Figure 2:
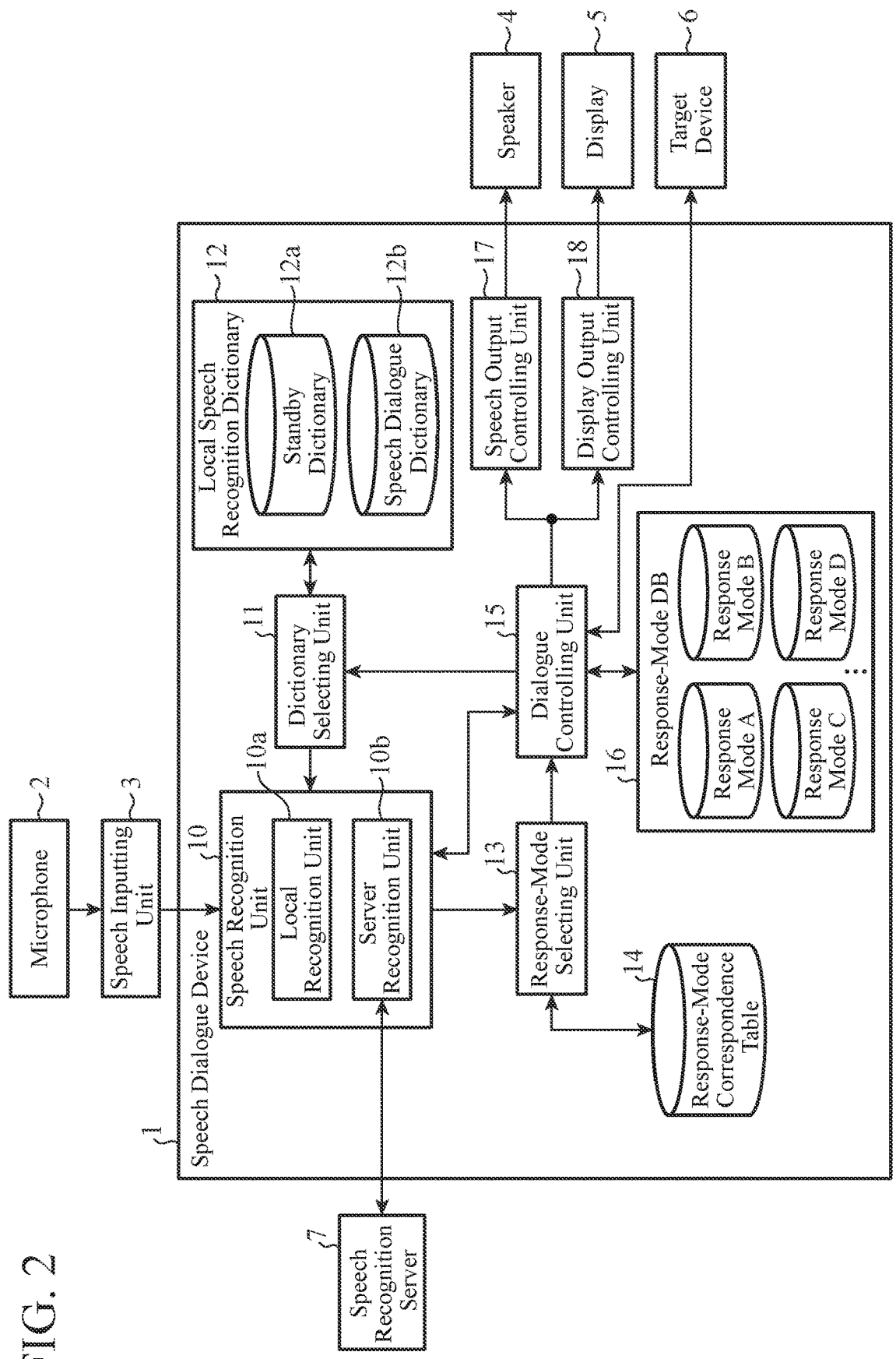
FIG. 2 is a block diagram illustrating an exemplary configuration of the speech dialogue device according to the first embodiment.

FIG. 2 is a block diagram illustrating an exemplary configuration of the speech dialogue device 1 according to the first embodiment. This speech dialogue device 1 includes a speech recognition unit 10, a dictionary selecting unit 11, a local speech recognition dictionary 12, a response-mode selecting unit 13, a response-mode correspondence table 14, a dialogue controlling unit 15, a response-mode database (DB) 16, a speech output controlling unit 17, and a display output controlling unit 18.

The microphone 2 captures the speech uttered by the user and outputs the speech to the speech inputting unit 3. The speech inputting unit 3 performs analog/digital (A/D) conversion on the speech from the microphone 2 through pulse code modulation (PCM), for example, and inputs the speech to the speech dialogue device 1.

The speech recognition unit 10 includes a local recognition unit 10a and a server recognition unit 10b. However, the server recognition unit 10b is not an essential element.

The speech recognition unit 10 receives the digitized speech data from the speech inputting unit 3. The speech recognition unit 10 detects, from the speech data, a speech section (hereinafter referred to as "uttered section") corresponding to the content uttered by the user, and outputs the speech section to the local recognition unit 10a or the server recognition unit 10b.

The local recognition unit 10a extracts a feature amount from the speech data in the uttered section that has been inputted. Then, the local recognition unit 10a performs recognition processing using a standby dictionary 12a or a speech dialogue dictionary 12b in the local speech recognition dictionary 12 on the basis of the feature amount, and outputs the recognition result to the response-mode selecting unit 13 or the dialogue controlling unit 15. Since a general method such as, for example, a hidden Markov model (HMM) method just needs to be employed and performed as the method of the recognition processing in the local recognition unit 10a, the detailed description thereof is omitted.

The server recognition unit 10b outputs the speech data in the inputted uttered section to a speech recognition server 7 on the network, and receives the recognition result from the speech recognition server 7. The speech recognition server 7 includes a speech recognition dictionary that is not illustrated, and performs processing for recognizing the speech data received from the server recognition unit 10b. The speech recognition server 7 then outputs the recognition result to the server recognition unit 10b. While there is a limitation in the memory capacity in the speech dialogue device 1, there is no limitation in the memory capacity in the speech recognition server 7. Therefore, the speech recognition server 7 is capable of performing high-performance recognition processing by using a larger speech recognition dictionary than the local speech recognition dictionary 12 stored in the speech dialogue device 1.

In the case where the standby dictionary 12a is selected by the dictionary selecting unit 11 described later, even when there is no instruction from the user to start a speech dialogue, the speech recognition unit 10 detects the uttered section of the speech data received from the speech inputting unit 3 and performs the above-described recognition processing in a preset period. The "preset period" includes, for example, a period from the activation or resumption of the speech dialogue device 1 to the termination or stop of the speech dialogue device 1, a period during which the speech recognition unit 10 is running, or the like.

In addition, in the case where the standby dictionary 12a is selected by the dictionary selecting unit 11, the speech recognition unit 10 outputs the recognition result to the response-mode selecting unit 13. In the case where the speech dialogue dictionary 12b is selected, the speech recognition unit 10 outputs the recognition result to the dialogue controlling unit 15.

Note that although the recognition result outputted from the speech recognition unit 10 will be described as a specific character string such as a command or the like, the recognition result may be anything such as, for example, an ID represented by numerals, as long as the commands or the like can be distinguished from each other.

In addition, the recognition processing may be performed by either the local recognition unit 10a or the server recognition unit 10b. However, in this first embodiment, in the case where the standby dictionary 12a is selected by the dictionary selecting unit 11, the recognition processing is performed by the local recognition unit 10a using the standby dictionary 12a. In the case where the speech dialogue dictionary 12b is selected, the recognition processing is performed by the local recognition unit 10a using the speech dialogue dictionary 12b or the recognition processing is performed by the server recognition unit 10b using the speech recognition server 7. In the case where the speech dialogue dictionary 12b is selected, the dialogue controlling unit 15 described later sends a notification of the instruction on whether the recognition processing is performed by the local recognition unit 10a or the server recognition unit 10b.

The dictionary selecting unit 11 selects the standby dictionary 12a or the speech dialogue dictionary 12b in the local speech recognition dictionary 12 following the instruction from the dialogue controlling unit 15. When the speech dialogue device 1 is activated or resumed or when the speech recognition unit 10 is activated, the dictionary selecting unit 11 selects the standby dictionary 12a. Then, when the user instructs the start of a speech dialogue and the dialogue controlling unit 15 instructs switching of the dictionary, the dictionary selecting unit 11 selects the standby dictionary 12a.

The local speech recognition dictionary 12 is stored in the speech dialogue device 1, and includes the standby dictionary 12a and the speech dialogue dictionary 12b.

The standby dictionary 12a predefines "keywords" used for the user to instruct the start of a speech dialogue. A keyword is used to expressly indicate the start of a speech dialogue when the user utters, to the speech dialogue device 1, a command or the like for operating the target device 6 (hereinafter referred to as "device operation command or the like"). In this first embodiment, furthermore, the user's keyword utterance corresponds to the instruction to start a speech dialogue.

Note that the keywords may be defined by the user, making the standby dictionary 12a changeable appropriately.

The speech dialogue dictionary 12b is a dictionary used by the speech recognition unit 10 after the speech dialogue starts. The device operation command or the like is predefined in the speech dialogue dictionary 12b. The detailed description is omitted because the content of the speech dialogue dictionary 12b depends on the target device 6. Incidentally, for example, when the target device 6 is a car navigation device, commands such as "enlarge the map", facility names, addresses, and the like are defined as recognition vocabulary in the speech dialogue dictionary 12b.

The response-mode selecting unit 13 receives the recognition result from the speech recognition unit 10. Then, the response-mode selecting unit 13 refers to the response-mode correspondence table 14 and selects a response mode ID corresponding to the keyword included in the recognition result. The response-mode selecting unit 13 then outputs the response mode ID to the dialogue controlling unit 15.

Here, FIG. 3 illustrates one example of the response-mode correspondence table 14. In the response-mode correspondence table 14, as illustrated in FIG. 3, for example, response mode IDs are associated with the keywords that serve as the instructions to start a speech dialogue.

Note that the response mode IDs defined in the response-mode correspondence table 14 are alphabets in the example of FIG. 3, but the response mode IDs may be anything such as character strings or IDs represented by numerals, as long as the response modes can be distinguished from each other.

The response-mode DB 16 stores a response mode for each response mode ID.

Here, FIG. 4 illustrates an example of the response-mode DB 16. In the response-mode DB 16, at least one of a speech type, language type, recognition type, proficiency-level type, and output type is associated with the response mode IDs.

The speech type indicates at least one of the speed, gender, age group, volume, and musical interval of the response speech outputted from the speaker 4.

The language type indicates at least one of a language of the response speech outputted from the speaker 4 or a language of the response display displayed on the display 5 and a dialect in each language.

The recognition type indicates whether to use the recognition result of the local recognition unit 10a or the recognition result of the server recognition unit 10b as the recognition result.

The proficiency-level type indicates the amount of information in the response, which corresponds to the level of proficiency, such as for beginners, intermediates, or the advanced. In the example of FIG. 4, for beginners, the amount of information in the response is increased and a careful speech response or display response is given. As the level of proficiency in the speech dialogue increases from intermediates to the advanced, the amount of information in the response is reduced and a simple speech response or display response is given.

The output type indicates either one of or both of the output form of the response speech outputted from the speaker 4 and the output form of the response display displayed on the display 5.

Note that the response modes may be allowed to be defined by the user, making the response-mode DB 16 changeable appropriately.

After the speech dialogue device 1 is activated or resumed or after the speech recognition unit 10 is activated, the dialogue controlling unit 15 first receives a response mode ID corresponding to a keyword for instructing the start of a speech dialogue. Then, the dialogue controlling unit 15 refers to the response-mode DB 16 and obtains a response mode corresponding to the response mode ID. The dialogue controlling unit 15 then sets a scenario for the speech dialogue corresponding to the response mode.

The scenario indicates, for example, a rule of the response of the speech dialogue device 1 to the utterance of the user from the start of a speech dialogue with the user to the completion of the operation of the target device 6. For example, the scenario for causing the car navigation device serving as the target device 6 to execute a peripheral facility search includes a response for prompting the user to utter a search area such as the address, a response for prompting the user to utter a facility name, a response for prompting the user to select the name of the desired facility by presenting a list of the results of the search using the facility name, and the like.

The dialogue controlling unit 15 may dynamically generate a scenario on the basis of the response mode obtained from the response-mode DB 16 or may select a scenario predefined for each response mode. For example, in the case of the response mode set for beginners, the scenario is set such that the user is prompted to utter, one by one, a search area, facility name, and the like required for the peripheral facility search described above. By contrast, in the case of the response mode set for the advanced, the scenario is set such that the user is prompted to freely utter a search area, facility name, and the like required for the peripheral facility search.

Then, after completion of the scenario setting, the dialogue controlling unit 15 instructs the dictionary selecting unit 11 to switch from the standby dictionary 12a to the speech dialogue dictionary 12b. In addition, the dialogue controlling unit 15 instructs the speech recognition unit 10 to start speech recognition of the device operation command or the like. Note that when the recognition type is set in the response mode obtained from the response-mode DB 16, the dialogue controlling unit 15 instructs the speech recognition unit 10 to switch between the local recognition unit 10a and the server recognition unit 10b.

After the speech recognition unit 10 starts the recognition processing using the speech dialogue dictionary 12b, the dialogue controlling unit 15 receives the recognition result from the speech recognition unit 10. The dialogue controlling unit 15 determines a response corresponding to the recognition result in line with the scenario and controls the response in the mode obtained from the response-mode DB 16. The dialogue controlling unit 15 then outputs the response to either the speech output controlling unit 17 or the display output controlling unit 18.

In addition, when the dialogue controlling unit 15 performs the speech dialogue in line with the scenario and receives the result of the recognition of the device operation command or the like from the speech recognition unit 10, the dialogue controlling unit 15 notifies the target device 6 of this device operation command or the like. For example, when the result of the recognition of the device operation command or the like is "enlarge the map", the dialogue controlling unit 15 instructs the target device 6 to enlarge the map screen.

The speech output controlling unit 17 generates synthesized speech on the basis of the response and mode received from the dialogue controlling unit 15 and outputs the generated synthesized speech data to the speaker 4. Since speech synthesis just needs to be performed using a publicly known technique, the description thereof is omitted. The speaker 4 receives the synthesized speech data from the speech output controlling unit 17 and outputs the synthesized speech data by speech.

The display output controlling unit 18 generates display data on the basis of the response and mode received from the dialogue controlling unit 15 and outputs the generated display data to the display 5. The display 5 receives the display data from the display output controlling unit 18 and displays the display data. The display 5 is a liquid-crystal display, an organic electroluminescence (EL) display, a head-up display, or the like.

Note that the input from the user during the speech dialogue is not limited to the speech input using the speech recognition, but may be made by manual operation using an input device such as a touch panel or a hardware key. For example, when the facility list information as the result of the execution of the peripheral facility search is displayed on the display 5, the user may utter a desired facility name from the facility list, or may select the desired facility by operating the input device. The dialogue controlling unit 15 receives the result of the recognition of the facility name or the input from the input device.

Figure 5A:
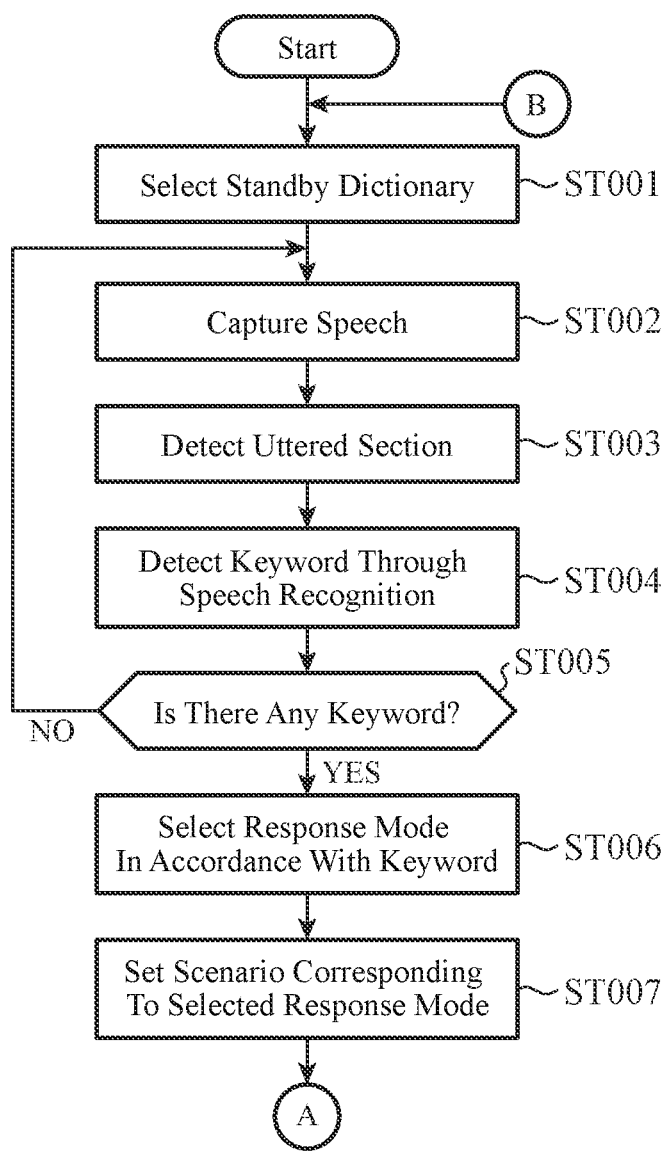
FIG. 5A is a flowchart illustrating operation in standby for an instruction to start a speech dialogue in the speech dialogue device according to the first embodiment.
Figure 5B:
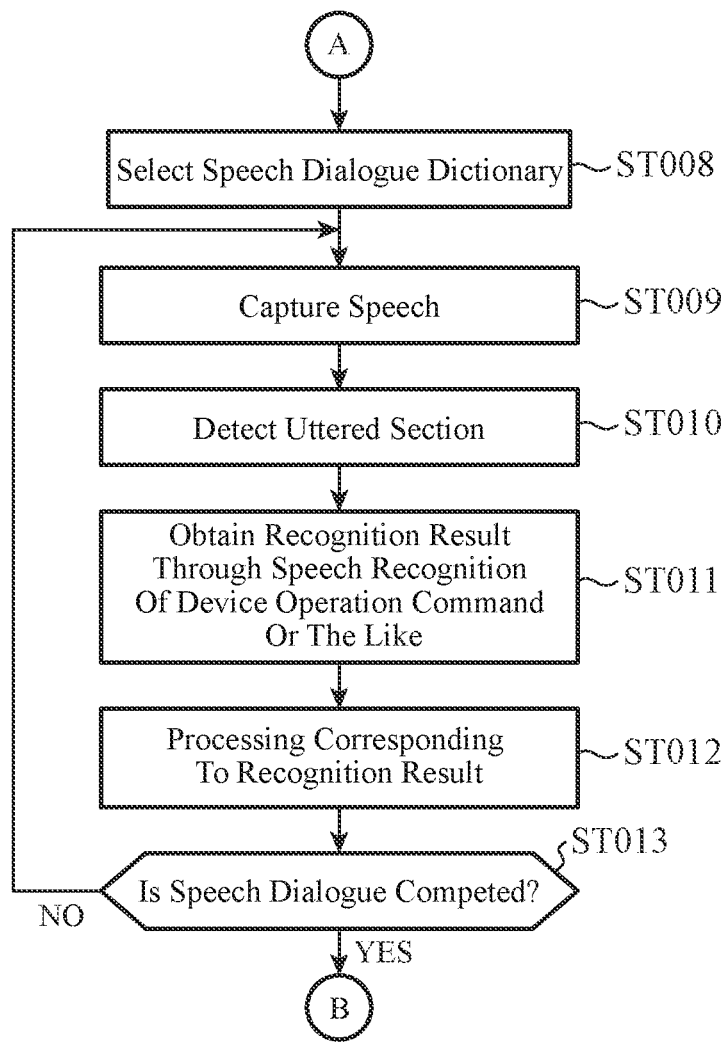
FIG. 5B is a flowchart illustrating operation when speech recognition is performed after the speech dialogue starts in the speech dialogue device according to the first embodiment.

Next, exemplary operation of the speech dialogue device 1 according to the first embodiment will be described using the flowcharts illustrated in FIGS. 5A and 5B and specific examples. FIG. 5A is a flowchart illustrating the operation of the speech dialogue device 1 in standby for the instruction to start a speech dialogue. FIG. 5B is a flowchart illustrating the operation of the speech dialogue device 1 when speech recognition is performed after the speech dialogue starts.

First, the operation of the speech dialogue device 1 in standby for the instruction to start a speech dialogue in FIG. 5A will be described.

In step ST001, the dictionary selecting unit 11 selects the standby dictionary 12a.

In step ST002, the speech recognition unit 10 starts capturing speech data via the microphone 2 and the speech inputting unit 3. In this state, when the user utters a keyword such as, for example, "start easy speech operation" illustrated in FIG. 3, the speech data of this utterance is inputted to the speech recognition unit 10.

In step ST003, the speech recognition unit 10 detects an uttered section of the speech data received from the speech inputting unit 3 and outputs the speech data in the uttered section to the local recognition unit 10a.

In step ST004, the local recognition unit 10a extracts a feature amount from the speech data in the uttered section. Then, the local recognition unit 10a performs recognition processing using the standby dictionary 12a on the basis of the feature amount, and detects the keyword for instructing the start of a speech dialogue.

In step ST005, when the local recognition unit 10a detects the keyword for instructing the start of a speech dialogue (step ST005 "YES"), the processing proceeds to step ST006. When the keyword is not detected. (step ST005 "NO"), the processing returns to step ST002.

In step ST006, the local recognition unit 10a outputs the detected keyword to the response-mode selecting unit 13. The response-mode selecting unit 13 selects, from the response-mode correspondence table 14, a response mode ID corresponding to the keyword from the local recognition unit 10a and outputs the response mode ID to the dialogue controlling unit 15. In this example, as illustrated in FIG. 3, the keyword is "start easy speech operation" and thus the response mode ID "A" is selected.

In step ST007, the dialogue controlling unit 15 obtains, from the response-mode DB 16, a response mode such as the speech type and the like corresponding to the response mode ID from the response-mode selecting unit 13. Then, the dialogue controlling unit 15 sets a scenario corresponding to the response mode obtained from the response-mode DB 16. In this example, the response mode ID "A" is selected. Therefore, as illustrated in FIG. 4, the response mode is set as a slow speed, a speech of a woman speaker in the young age group, Japanese, local speech recognition, the amount of information for beginners, and a response by speech and display.

Subsequently, a description will be given for the operation of the speech dialogue device 1 in FIG. 5B in a case where speech recognition is performed after the start of the speech dialogue.

After the dialogue controlling unit 15 sets the scenario for the speech dialogue in step ST007 in FIG. 5A, the processing proceeds to step ST008 in FIG. 5B.

In step ST008, the dialogue controlling unit 15 instructs the dictionary selecting unit 11 to switch from the standby dictionary 12a to the speech dialogue dictionary 12b. The dictionary selecting unit 11 selects the speech dialogue dictionary 12b following the instruction from the dialogue controlling unit 15.

In addition, when the recognition type is set as the response mode, the dialogue controlling unit 15 instructs the speech recognition unit 10 to switch to the local recognition unit 10a or the server recognition unit 10b following the setting. In this example, the local speech recognition is set as the response mode of the response mode ID "A". Therefore, the speech recognition unit 10 switches to the local recognition unit 10a following the instruction from the dialogue controlling unit 15.

In step ST009, the speech recognition unit 10 starts capturing speech data via the microphone 2 and the speech inputting unit 3. In this state, when the user utters "peripheral facility search", for example, the speech data of this utterance is inputted to the speech recognition unit 10.

In step ST010, the speech recognition unit 10 detects an uttered section of the speech data received from the speech inputting unit 3 and outputs the speech data in the uttered section to the local recognition unit 10a.

In step ST011, the local recognition unit 10a extracts a feature amount from the speech data in the uttered section. Then, the local recognition unit 10a performs recognition processing using the speech dialogue dictionary 12b on the basis of the feature amount, and obtains the result of the recognition of the device operation command or the like. The local recognition unit 10a then outputs the recognition result to the dialogue controlling unit 15.

Figure 6:
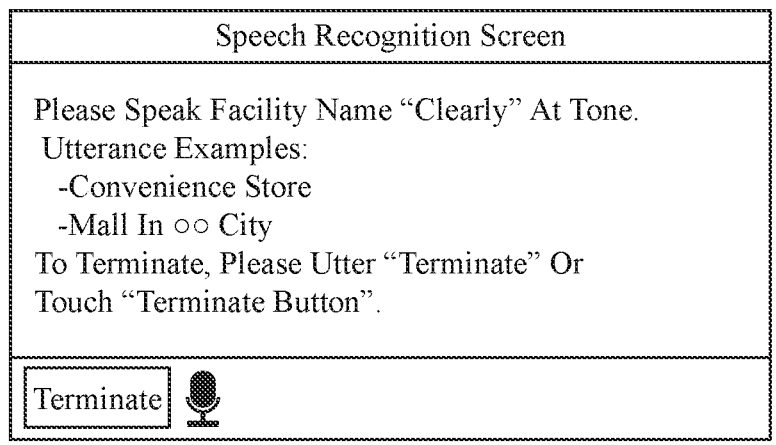
FIG. 6 is an example of a response display with a large amount of information for beginners in the speech dialogue device according to the first embodiment.

In step ST012, the dialogue controlling unit 15 performs processing corresponding to the recognition result from the local recognition unit 10a in line with the scenario. In this example, when the dialogue controlling unit 15 receives the recognition result "peripheral facility search", the dialogue controlling unit 15 instructs the speech output controlling unit 17 to output a response in Japanese with a large amount of information such as "Peripheral facility search starts. Please speak the facility name clearly after the tone." by speech of a woman in the young age group at a slow speed. Furthermore, the dialogue controlling unit 15 instructs the display output controlling unit 18 to display the response in Japanese with a large amount of information as illustrated in FIG. 6, for example. In response to the instruction from the dialogue controlling unit 15, the speech output controlling unit 17 causes the speaker 4 to output the response speech.

In response to the instruction from the dialogue controlling unit 15, the display output controlling unit 18 causes the display 5 to output the response display.

In step ST013, when the speech dialogue in line with the scenario is completed (step ST013 "YES"), the dialogue controlling unit 15 returns to step ST001, while when not completed (step ST013 "NO"), the dialogue controlling unit 15 returns to step ST009. Note that in addition to the determination of whether the speech dialogue in line with the scenario has been completed, the dialogue controlling unit 15 may also determine that the speech dialogue has been completed when the dialogue controlling unit 15 receives a termination instruction from the user through a speech input using the speech recognition or through an input by manual operation using an input device, for example.

Figure 7:
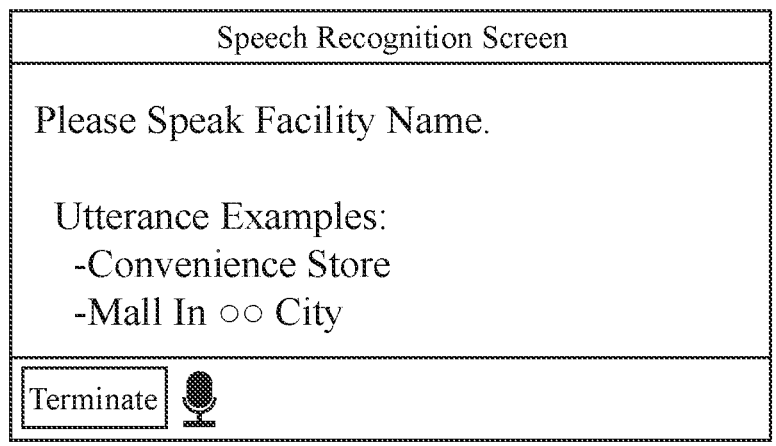
FIG. 7 is an example of a response display with a normal amount of information for intermediates in the speech dialogue device according to the first embodiment.
Figure 8:
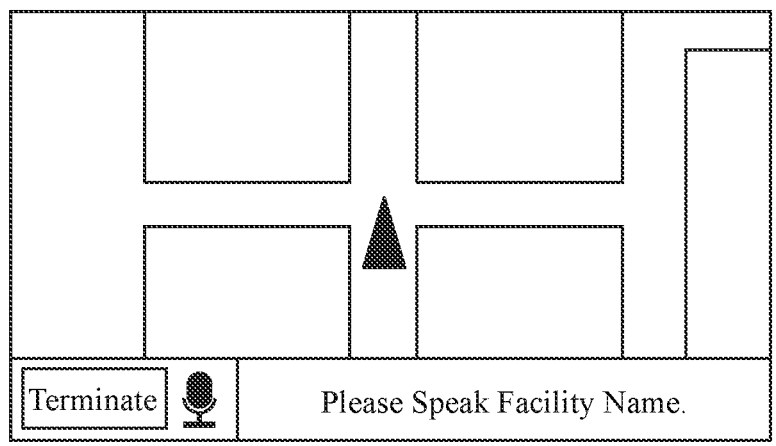
FIG. 8 is an example of a response display with a small amount of information for the advanced in the speech dialogue device according to the first embodiment.

Here, FIGS. 6, 7, and 8 illustrate examples of the response display corresponding to the recognition result "peripheral facility search".

FIG. 6 illustrates an example of the response display with a large amount of information for beginners. The display 5 displays a careful text "Please speak the facility name "clearly" after the tone." as well as utterance examples. Furthermore, the guidance for terminating the "peripheral facility search" is also displayed.

In addition, the speaker 4 outputs synthesized speech with careful content such as, for example, "Peripheral facility search starts. Please speak the facility name clearly after the tone.", which is an example of the response speech with a large amount of information for beginners.

FIG. 7 illustrates an example of the response display with a normal amount of information for intermediates. The display 5 displays a simple text "Please speak the facility name." as well as utterance examples. For intermediates, the display of the guidance for terminating the "peripheral facility search" is omitted.

In addition, the speaker 4 outputs synthesized speech with simple content such as, for example, "Please speak the facility name.", which is an example of the response speech with a normal amount of information for intermediates.

FIG. 8 illustrates an example of the response display with a small amount of information for the advanced. The display 5 displays a simple text "Please speak the facility name." in small size so as not to hide the map screen originally displayed. For the advanced, the display of the utterance examples of the "peripheral facility search" and the termination guidance are omitted.

In addition, as an example of the response speech with a small amount of information for the advanced, for example, the synthesized speech is not outputted from the speaker 4 but only the sound indicating the start of the utterance is outputted.

As described above, the speech dialogue device 1 according to the first embodiment includes the speech recognition unit 10, the response-mode selecting unit 13, the dialogue controlling unit 15, and the speech output controlling unit 17. The speech recognition unit 10 recognizes uttered speech. The response-mode selecting unit 13 selects a mode of a response corresponding to a keyword included in the recognition result of the speech recognition unit 10 using the response-mode correspondence table 14. The response-mode correspondence table 14 defines a correspondence relationship between keywords for instructing the start of a speech dialogue and the modes of the response. The dialogue controlling unit 15 starts the speech dialogue when the keyword is included in the recognition result of the speech recognition unit 10, determines a response in accordance with the subsequent recognition result from the speech recognition unit 10, and controls a mode of the response in such a manner as to match the mode selected by the response-mode selecting unit 13. The speech output controlling unit 17 generates and outputs the speech data to the speaker 4 on the basis of the response and mode controlled by the dialogue controlling unit 15. With this configuration, the instruction to start a speech dialogue can be given by the utterance by the user. Moreover, the response mode can be changed in accordance with the content uttered as the instruction to start the speech dialogue. Therefore, the mode of the response can be changed instantaneously and easily in the speech dialogue. This is particularly effective when the speech dialogue device 1 is mounted in a vehicle. This is because switching between response modes may occur frequently when the speech dialogue device 1 is shared and used by a plurality of users such as a user in the driver seat and a user in the passenger seat and each of the users has a different level of proficiency for the speech dialogue, preference, and the like.

In addition, according to the first embodiment, the response-mode selecting unit 13 is configured to select the speed, gender, age, volume, or musical interval of the response speech as the mode of the response. In addition, the response-mode selecting unit 13 may also be configured to select a language of the response or a dialect in each language as the mode of the response. In addition, the response-mode selecting unit 13 may also be configured to select either one of or both of the speech response from the speaker 4 and the display response on the display 5 as the mode of the response. This enables the switching of the response mode to match the preference of the user.

In addition, according to the first embodiment, the speech recognition unit 10 includes the local recognition unit 10a and the server recognition unit 10b. The local recognition unit 10a recognizes uttered speech using the local speech recognition dictionary 12 in the speech dialogue device 1. The server recognition unit 10b uses and causes the external speech recognition server 7 to recognize uttered speech and obtains the recognition result. Then, the dialogue controlling unit 15 is configured to determine a response using the recognition result of the local recognition unit 10a or the recognition result of the server recognition unit 10b. In this way, the user is able to use high-performance speech recognition provided by the speech recognition server 7.

In addition, according to the first embodiment, the response-mode selecting unit 13 is configured to select, as the mode of the response, the amount of information in the response corresponding to the user's level of proficiency in the speech dialogue. This enables the switching of the response mode to match the user's level of proficiency.

Second Embodiment

In the configuration of the above-described first embodiment, the instruction to start a speech dialogue is given by the utterance by the user. In the configuration of this second embodiment, by contrast, the instruction to start a speech dialogue is given when the user presses a button.

Figure 9:
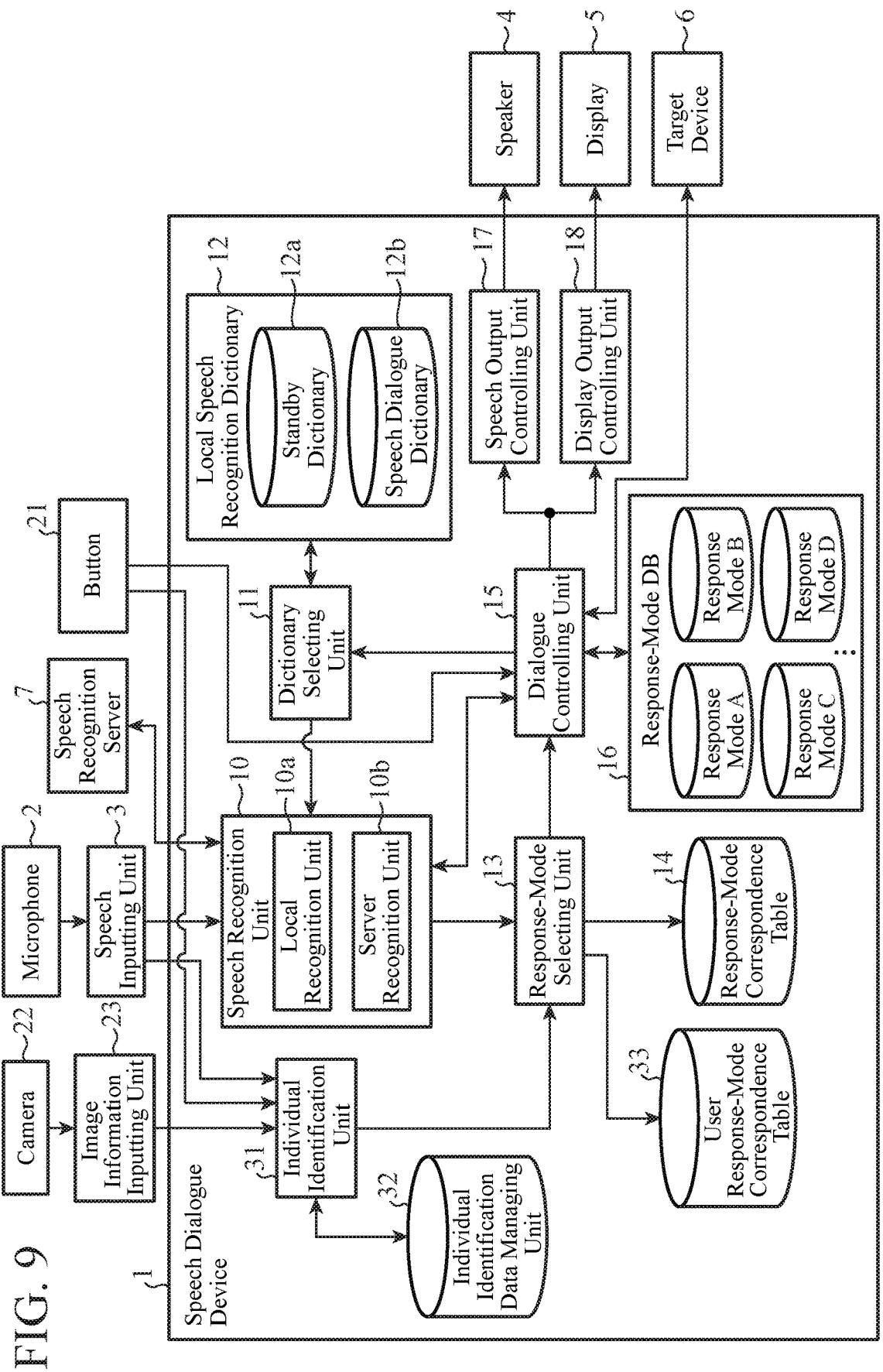
FIG. 9 is a block diagram illustrating an exemplary configuration of a speech dialogue device according to a second embodiment of the present invention.

FIG. 9 is a block diagram illustrating an exemplary configuration of a speech dialogue device 1 according to the second embodiment of the present invention. A button 21, a camera 22, and an image information inputting unit 23 are added to a speech dialogue system to which the speech dialogue device 1 according to the second embodiment is used. The button 21 instructs the start of a speech dialogue. In addition, an individual identification unit 31, an individual identification data managing unit 32, and a user response-mode correspondence table 33 are added to the speech dialogue device 1. The individual identification unit 31 identifies the user who has operated the button 21 for instructing the start of a speech dialogue. The individual identification data managing unit 32 manages data necessary for user identification. The user response-mode correspondence table 33 defines a correspondence relationship between users and modes of the response.

Note that portions identical or equivalent to those in FIGS. 1 and 2 are denoted by the identical signs in FIG. 9, and the description thereof is omitted.

The second embodiment will be described below using an example where the speech dialogue system is mounted in a vehicle.

In the second embodiment, a microphone 2 is a microphone array. A speech inputting unit 3 identifies a sound source direction of the utterance on the basis of the phase difference or the like between sound receiving signals of the microphone array, and generates uttered direction information indicating from which side the utterance is made, either the driver seat or the passenger seat. The speech inputting unit 3 then outputs the uttered direction information to the individual identification unit 31.

The button 21 for instructing the start of a speech dialogue notifies a dialogue controlling unit 15 and the individual identification unit 31 of the start of the speech dialogue when the button 21 is pressed by the user. This button 21 is an input device such as a touch panel or a hardware key, for example.

The camera 22 captures an image of the vehicle interior and outputs image information to the image information inputting unit 23. This camera 22 captures an image of the upper body of each user in the driver seat and the passenger seat, for example.

The image information inputting unit 23 receives the image information from the camera 22 and outputs the image information to the individual identification unit 31.

Figure 10:
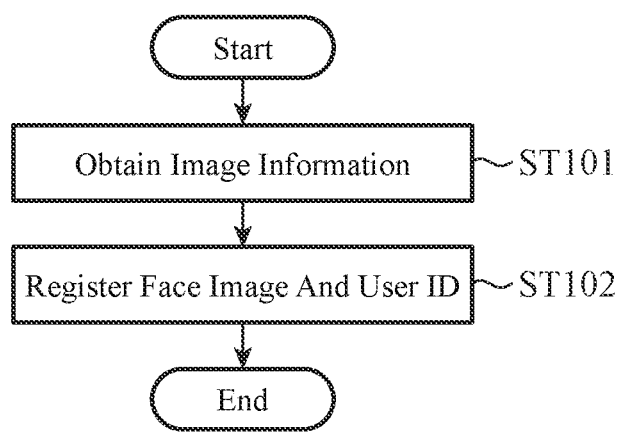
FIG. 10 is a flowchart illustrating operation when a user ID is registered in the speech dialogue device 1 according to the second embodiment.

FIG. 10 is a flowchart illustrating the operation when a user ID is registered in the speech dialogue device 1 according to the second embodiment.

In step ST101, when the individual identification unit 31 receives an instruction to register a user ID from the user through a speech input or an input to an input device that is not illustrated, the individual identification unit 31 receives image information via the camera 22 and the image information inputting unit 23 and obtains a face image from the image information.

In step ST102, the individual identification unit 31 registers the face image of the user and an arbitrary ID in association with each other in the individual identification data managing unit 32. For example, when users are seated both in the driver seat and the passenger seat, the individual identification unit 31 registers the face image of the user seated in the driver seat as a user ID "001" and the face image of the user seated in the passenger seat as a user ID "002".

Figure 11:
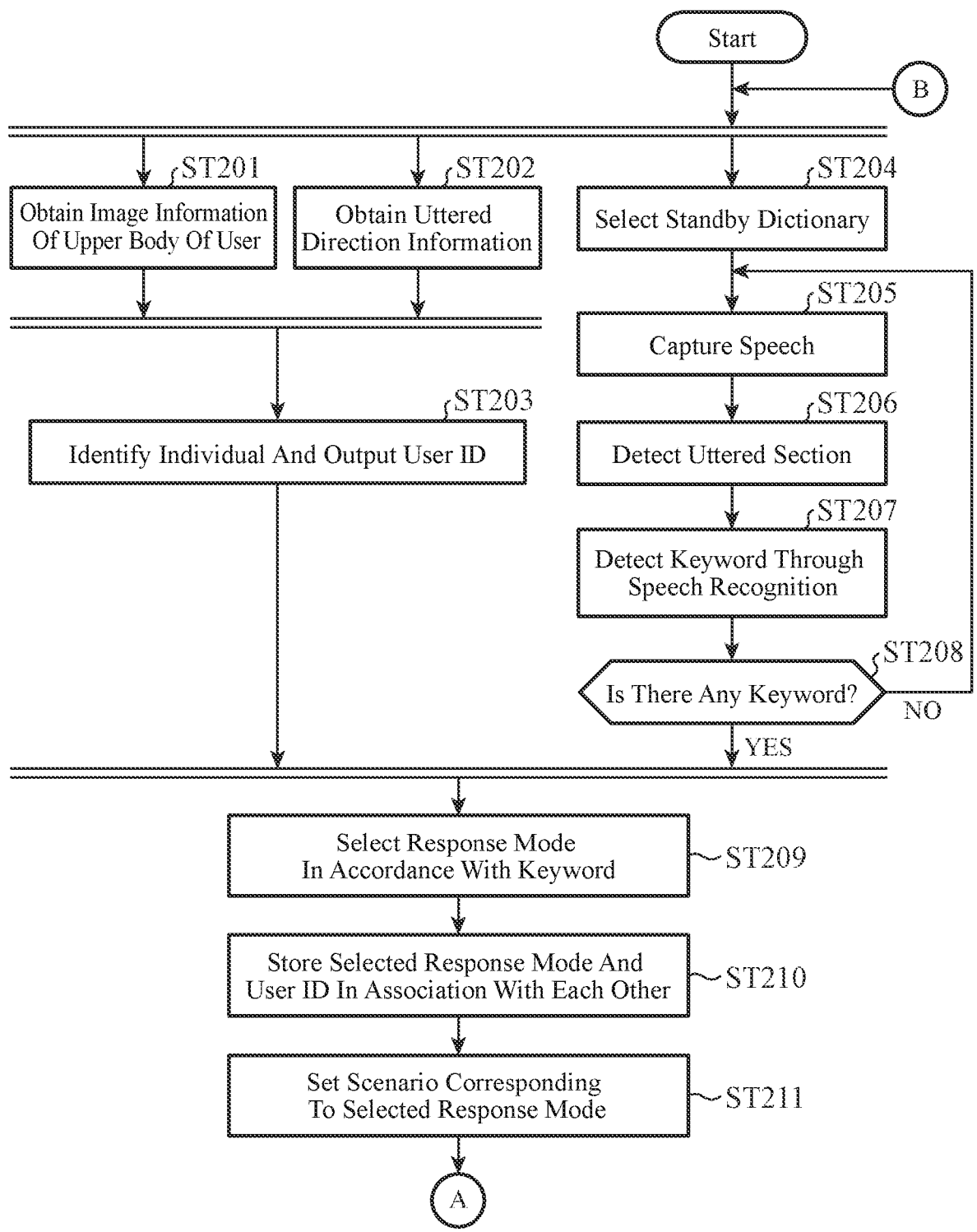
FIG. 11 is a flowchart illustrating operation when the user ID and a response mode ID are registered in association with each other in the speech dialogue device 1 according to the second embodiment.

FIG. 11 is a flowchart illustrating the operation when a user ID and a response mode ID are registered in association with each other in the speech dialogue device 1 according to the second embodiment. In this second embodiment, when a keyword for instructing the start of a speech dialogue is uttered, not only is the control made to become the response mode corresponding to this keyword as with the above-described first embodiment, but also processing for identifying the user who has uttered the keyword and registering the user and the response mode in association with each other is performed.

When the speech dialogue device 1 stands by for the instruction to start a speech dialogue, the individual identification unit 31 receives image information from the image information inputting unit 23 in step ST201.

In step ST202, the individual identification unit 31 receives uttered direction information from the speech inputting unit 3 in parallel with step ST201.

In step ST203, the individual identification unit 31 detects face images of the respective users seated in the driver seat and the passenger seat from the image information received from the image information inputting unit 23 and performs individual identification by comparing the face images with the face images managed by the individual identification data managing unit 32. The individual identification unit 31 then obtains the user IDs. Since a general method such as, for example, the Karhunen-Loeve (KL) expansion method of Fourier spectrum just needs to be employed as the comparison method, the description is omitted.

Then, on the basis of the uttered direction information received from the speech inputting unit 3, the individual identification unit 31 determines which user is uttering, either the user seated in the driver seat or the user seated in the passenger seat. The individual identification unit 31 then outputs the user ID of the uttering user to a response-mode selecting unit 13. The user ID outputted from the individual identification unit 31 to the response-mode selecting unit 13 is the user ID indicating the user currently uttering.

Since the processing in steps ST204 to ST208 is similar to the processing in steps ST001 to ST005 illustrated in FIG. 5A in the above-described first embodiment, the description is omitted. Note that the processing in steps ST204 to ST208 is performed in parallel with the processing in steps ST201 to ST203.

When the response-mode selecting unit 13 receives a keyword for instructing the start of a speech dialogue from a speech recognition unit 10, the response-mode selecting unit 13 selects a response mode ID corresponding to the keyword from a response-mode correspondence table 14 in step ST209.

At the timing when the response-mode selecting unit 13 receives the keyword from the speech recognition unit 10, the response-mode selecting unit 13 registers the user ID received from the individual identification unit 31 and the response mode ID selected from the response-mode correspondence table 14 in association with each other in the user response-mode correspondence table 33 in step ST210. In this way, the user ID of the user who has uttered the keyword is associated with the response mode ID instructed by the user through the utterance of the keyword.

In step ST211, the response-mode selecting unit 13 outputs the response mode ID selected in step ST209 to the dialogue controlling unit 15. The dialogue controlling unit 15 obtains, from a response-mode DB 16, a response mode such as the speech type and the like corresponding to the response mode ID from the response-mode selecting unit 13. Then, after the dialogue controlling unit 15 sets a scenario corresponding to the response mode obtained from the response-mode DB 16, the dialogue controlling unit 15 proceeds to steps ST008 to ST013 illustrated in FIG. 5B in the first embodiment described above.

Note that in the user response-mode correspondence table 33, one user ID may be registered in association with the latest, only one response mode ID, or when a user performs the keyword operation multiple times, for example, one user ID indicating this user may be registered in association with a plurality of response mode IDs. By registering the plurality of response mode IDs such that the number of times or the registration order can be identified for each response mode ID, when the response-mode selecting unit 13 obtains a response mode ID corresponding to a certain user ID from the user response-mode correspondence table 33, the response-mode selecting unit 13 can obtain the latest response mode ID associated with this user ID or the response mode ID most associated with this user ID.

Figure 12:
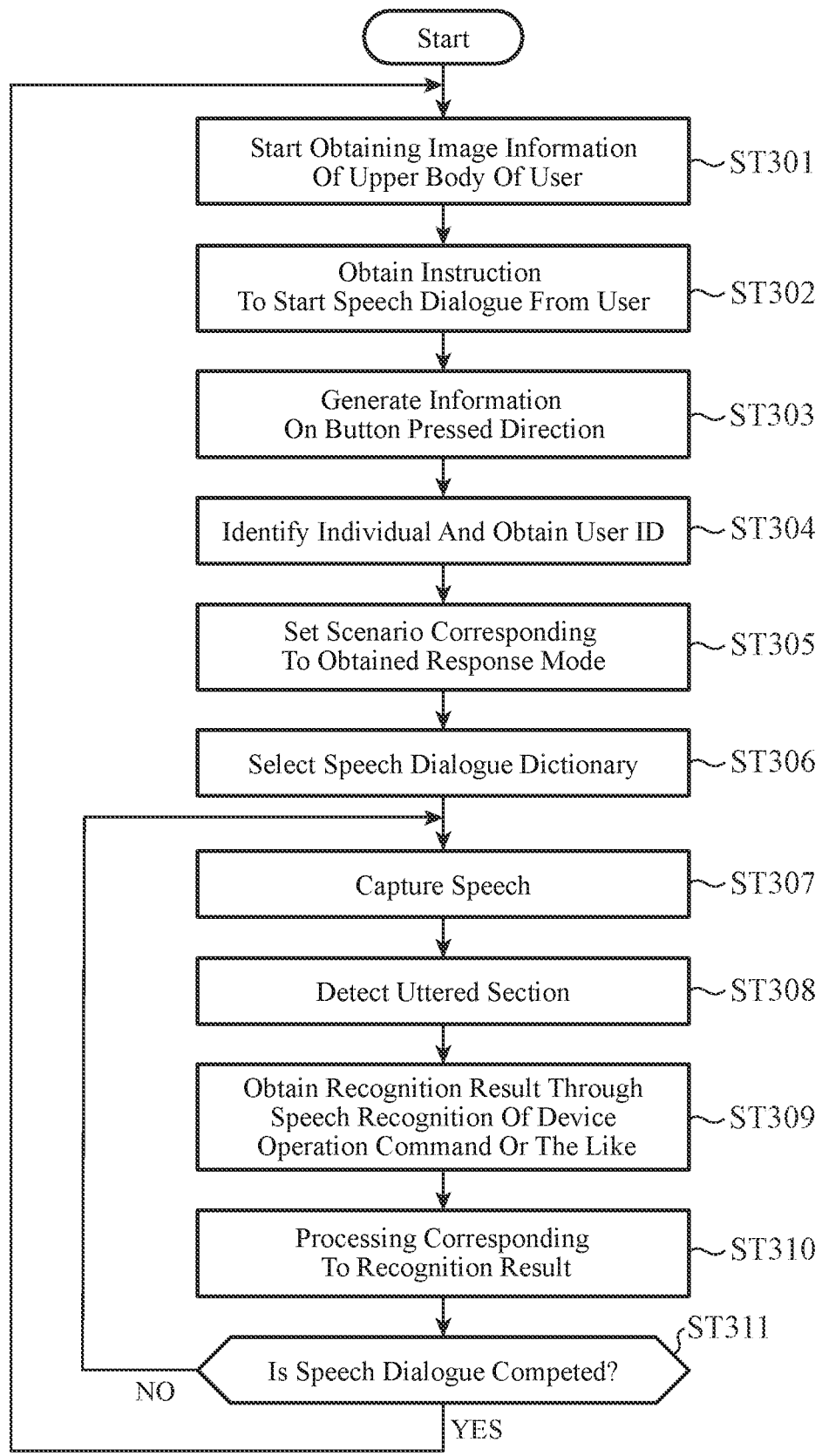
FIG. 12 is a flowchart illustrating operation when a button for instructing start of a speech dialogue is pressed in the speech dialogue device 1 according to the second embodiment.

FIG. 12 is a flowchart illustrating the operation when the button 21 for instructing the start of a speech dialogue is pressed in the speech dialogue device 1 according to the second embodiment.

When the speech dialogue device 1 stands by for the instruction to start a speech dialogue, the individual identification unit 31 starts receiving image information from the image information inputting unit 23 in step ST301.

In step ST302, when the button 21 for instructing the start of a speech dialogue is pressed, the button 21 outputs the instruction to start a speech dialogue to the dialogue controlling unit 15 and the individual identification unit 31.

In step ST303, when the individual identification unit 31 receives the instruction to start a speech dialogue from the button 21, the individual identification unit 31 uses a pattern recognition method such as, for example, a support vector machine (SVM) to detect, from the image information, user motion similar to a preliminarily learned motion model when the button 21 is pressed. The preliminarily learned motion model is the model for the motion in which the user seated in the driver seat presses the button 21 and the motion in which the user seated in the passenger seat presses the button 21. When the individual identification unit 31 detects the motion similar to the motion model, the individual identification unit 31 identifies which user in the driver seat or the passenger seat has pressed the button 21, and generates information on the button pressed direction.

In step ST304, the individual identification unit 31 performs individual identification by comparing the face images of the respective users seated in the driver seat and the passenger seat with the face images managed by the individual identification data managing unit 32. The individual identification unit 31 then obtains the user ID of each user. Then, the individual identification unit 31 identifies the user who has pressed the button 21 by using the identification result of each of the users seated in the driver seat and the passenger seat and the information on the button pressed direction, and outputs the user ID associated with this user to the response-mode selecting unit 13. For example, when the user seated in the driver seat has pressed the button 21 for instructing the start of a speech dialogue, the user ID "001" corresponding to this user is outputted from the individual identification unit 31 to the response-mode selecting unit 13.

In step ST305, the response-mode selecting unit 13 selects, from the user response-mode correspondence table 33, a response mode ID corresponding to the user ID from the individual identification unit 31, and outputs the response mode ID to the dialogue controlling unit 15. In this example, the response mode ID "A" is stored in association with the user ID "001" in the user response-mode correspondence table 33. Thus, the response mode ID "A" is outputted from the response-mode selecting unit 13 to the dialogue controlling unit 15.

Since the processing in steps ST306 to ST311 is similar to the processing in steps ST008 to ST013 illustrated in FIG. 5B in the above-described first embodiment, the description is omitted.

After the user ID and the response mode ID are associated with each other, it is possible to instantaneously switch to the response mode matching the user's preference, level of proficiency, or the like not only by the utterance of a keyword for starting a speech dialogue but also by pressing of the button 21 for instructing the start of a speech dialogue. This reduces the burden on the user more.

Note that by performing the operation illustrated in the flowchart in FIG. 11 and the operation illustrated in the flowchart in FIG. 12 in parallel, the speech dialogue device 1 can start a speech dialogue regardless of whether utterance of a keyword or pressing of the button 21 is made.

As described above, the speech dialogue device 1 according to the second embodiment includes the individual identification unit 31 for identifying the user who has operated the button 21 for instructing the start of a speech dialogue. Then, the response-mode selecting unit 13 selects a mode of a response corresponding to the user identified by the individual identification unit 31 using the user response-mode correspondence table 33 that defines a correspondence relationship between users and the modes of the response. The dialogue controlling unit 15 starts the speech dialogue when the button 21 is operated, determines a response in accordance with the subsequent recognition result from the speech recognition unit 10, and controls a mode of this response in such a manner as to match the mode selected by the response-mode selecting unit 13. With this configuration, the instruction to start a speech dialogue can be given by the button operation. Moreover, the response mode can be changed in accordance with the user who has operated this button. Therefore, the mode of the response can be changed instantaneously and easily in the speech dialogue. In addition, conventionally, a plurality of preset buttons in which response modes are defined in advance needs to be displayed on the screen. However, since only one button is required according to this second embodiment, it is effective for a device having display restrictions such as in-vehicle equipment.

In addition, according to the second embodiment, the individual identification unit 31 is configured to identify the user who has uttered a keyword for instructing the start of a speech dialogue. The response-mode selecting unit 13 is configured to register the user identified by the individual identification unit 31 and a mode of a response corresponding to the keyword in association with each other in the user response-mode correspondence table 33. In this way, the user ID can be automatically associated with the response mode ID when the user utters a keyword and starts a speech dialogue. Therefore, after the association is made, it is possible to instantaneously switch to the response mode matching the user's preference, level of proficiency, or the like even by pressing of the button 21 for instructing the start of a speech dialogue. This reduces the burden on the user more.

Lastly, an exemplary hardware configuration of the speech dialogue system according to each embodiment of the present invention will be described with reference to FIG. 13.

Figure 13:
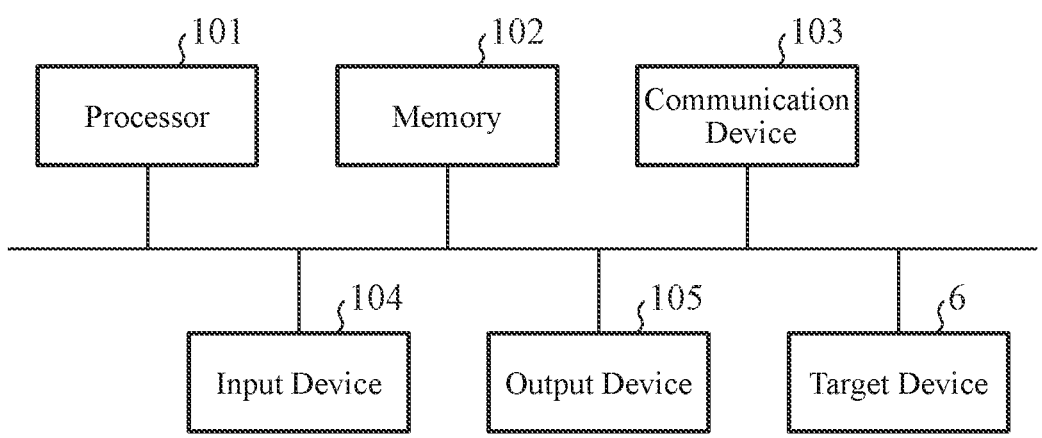
FIG. 13 is a diagram of a hardware configuration of the speech dialogue system to which the speech dialogue device according to each embodiment of the present invention is used.

In FIG. 13, the speech dialogue system includes a processor 101, a memory 102, a communication device 103, an input device 104, an output device 105, and the target device 6.

In the server recognition unit 10b, the communication device 103 implements the function of communicating with the speech recognition server 7.

The microphone 2, the speech inputting unit 3, the button 21 for instructing the start of a speech dialogue, the camera 22, and the image information inputting unit 23 are the input device 104. The speaker 4 and the display 5 are the output device 105.

In addition, the speech recognition unit 10, the dictionary selecting unit 11, the response-mode selecting unit 13, the dialogue controlling unit 15, the speech output controlling unit 17, the display output controlling unit 18, and the individual identification unit 31 in the speech dialogue device 1 are the processor 101 for executing a program stored in the memory 102. The processor 101 is also referred to as a central processing unit (CPU), a processing device, a computing device, a microprocessor, a microcomputer, a digital signal processor (DSP), or the like.

Each function of the speech recognition unit 10, the dictionary selecting unit 11, the response-mode selecting unit 13, the dialogue controlling unit 15, the speech output controlling unit 17, the display output controlling unit 18, and the individual identification unit 31 is implemented by software, firmware, or a combination of the software and the firmware. The software or the firmware is described as a program and stored in the memory 102. The processor 101 implements the function of each unit by reading and executing the program stored in the memory 102. That is, the speech dialogue device 1 includes the memory 102 for storing the program by which each step illustrated in FIGS. 5A, 5B, 10, 11, and 12 is consequently executed upon execution by the processor 101. In addition, it can also be said that this program causes a computer to execute the procedures or methods for each unit of the speech dialogue device 1.

In addition, the local speech recognition dictionary 12, the response-mode correspondence table 14, the response-mode DB 16, the individual identification data managing unit 32, and the user response-mode correspondence table 33 in the speech dialogue device 1 are the memory 102. The memory 102 may be, for example, a nonvolatile or volatile semiconductor memory such as a random access memory (RAM), a read only memory (ROM), a flash memory, an erasable programmable ROM (EPROM), and an electrically EPROM (EEPROM), may be a magnetic disk such as a hard disk and a flexible disk, or may be an optical disc such as a mini disc, a compact disc (CD), and a digital versatile disc (DVD).

Note that arbitrary combinations of the embodiments, modifications on arbitrary components in the embodiments, or omission of arbitrary components in the embodiments can be made in the present invention within the scope of the invention.

In addition, although the description has been given of the application in which the speech dialogue device 1 is mounted in the vehicle in the first and second embodiments, the speech dialogue device 1 may be used for applications other than the vehicle.

INDUSTRIAL APPLICABILITY

The speech dialogue device according to the present invention can instantaneously and easily change a mode of a response in a speech dialogue. Therefore, the speech dialogue device according to the present invention is suitable for use in a speech dialogue device or the like that is shared and used by a plurality of users having different levels of proficiency in the speech dialogue, like in-vehicle equipment such as a car navigation device.

REFERENCE SIGNS LIST

1: speech dialogue device, 2: microphone, 3: speech inputting unit, 4: speaker, 5: display, 6: target device, 7:

speech recognition server, 10: speech recognition unit, 10a: local recognition unit, 10b: server recognition unit, 11: dictionary selecting unit, 12: local speech recognition dictionary, 12a: standby dictionary, 12b: speech dialogue dictionary, 13: response-mode selecting unit, 14: response-mode correspondence table, 15: dialogue controlling unit, 16: response-mode DB, 17: speech output controlling unit, 18: display output controlling unit, 21: button, 22: camera, 23: image information inputting unit, 31: individual identification unit, 32: individual identification managing table, 33: user response-mode correspondence table, 101: processor, 102: memory, 103: communication device, 104: input device, 105: output device

The invention claimed is:

1. A speech dialogue device comprising:
    a speech recognizer to recognize uttered speech;
    a response-mode selector to select a mode of a response corresponding to a keyword included in a recognition result of the speech recognizer using a response-mode correspondence table defining a correspondence relationship between the keyword for instructing start of a speech dialogue and the mode of the response;
    a dialogue controller to start the speech dialogue when the keyword is included in the recognition result of the speech recognizer, determine a response in accordance with a subsequent recognition result from the speech recognizer, and control a mode of the response in such a manner as to match the mode selected by the response-mode selector; and
    a speech output controller to generate speech data on a basis of the response and the mode that are controlled by the dialogue controller and output the speech data to a speaker,
    wherein the speech recognizer includes:
        a local recognizer to recognize the uttered speech using a local speech recognition dictionary in the speech dialogue device; and
        a server recognizer to use and cause an external speech recognition server to recognize the uttered speech and obtain a recognition result,
    the response-mode selector selects the local recognizer or the server recognizer that corresponds to the keyword using the response-mode correspondence table defining a correspondence relationship between the keyword and the local recognizer or the server recognizer, and
    the dialogue controller switches to the local recognizer or the server recognizer selected by the response-mode selector and determines the response in accordance with a recognition result from the local recognizer or the server recognizer after the switching.

2. The speech dialogue device according to claim 1, further comprising:
    an individual identification unit to identify a user who has operated a button for instructing start of a speech dialogue,
    wherein the response-mode selector selects a mode of a response corresponding to the user identified by the individual identification unit using a user response-mode correspondence table defining a correspondence relationship between the user and the mode of the response, and
    the dialogue controller starts the speech dialogue when the button is operated, determines a response in accordance with a subsequent recognition result from the speech recognizer and controls a mode of the response in such a manner as to match the mode selected by the response-mode selector.

3. The speech dialogue device according to claim 1, wherein the response-mode selector selects, as the mode of the response, speed, gender, age, volume, or a musical interval of speech of the response.

4. The speech dialogue device according to claim 1, wherein the response-mode selector selects, as the mode of the response, a language of the response or a dialect in each language.

5. The speech dialogue device according to claim 1, wherein the response-mode selector selects, as the mode of the response, an amount of information in the response corresponding to a level of proficiency of a user in the speech dialogue.

6. The speech dialogue device according to claim 1, further comprising:
    a display output controller to generate display data on a basis of the response controlled by the dialogue controller and output the display data to a display,
    wherein the response-mode selector selects, as the mode of the response, either one of or both of a speech response from the speaker and a display response on the display.

7. The speech dialogue device according to claim 2,
    wherein the individual identification unit identifies a user who has uttered the keyword for instructing the start of the speech dialogue, and
    the response-mode selector registers the user identified by the individual identification unit and the mode of the response corresponding to the keyword uttered by the user in association with each other in the user response-mode correspondence table.

8. A speech dialogue method in a speech dialogue device, comprising:
    recognizing, by a speech recognizer, uttered speech;
    selecting, by a response-mode selector, a mode of a response corresponding to a keyword included in a recognition result of the speech recognizer using a response-mode correspondence table defining a correspondence relationship between the keyword for instructing start of a speech dialogue and the mode of the response;
    starting, by a dialogue controller, the speech dialogue when the keyword is included in the recognition result of the speech recognizer,
    determining, by the dialogue controller, a response in accordance with a subsequent recognition result from the speech recognizer, and
    controlling, by the dialogue controller, a mode of the response in such a manner as to match the mode selected by the response-mode selector; and
    generating, by a speech output controller, speech data on a basis of the response and the mode that are controlled by the dialogue controller and outputting the speech data to a speaker,
    wherein the speech dialogue method further includes:
        recognizing, by the speech recognizer, the uttered speech using a local speech recognition dictionary in the speech dialogue device; and
        using and causing, by the speech recognizer, an external speech recognition server to recognize the uttered speech and obtaining a recognition result,
    selecting, by the response-mode selector, a local recognizer or a server recognizer that corresponds to the keyword using the response-mode correspondence table defining a correspondence relationship between the keyword and the local recognizer or the server recognizer, and switching, by the dialogue controller, to the local recognizer or the server recognizer selected by the response-mode selector and determining, by the dialogue controller, the response in accordance with a recognition result from the local recognizer or the server recognizer after the switching step.

\* \* \* \* \*